United States Patent [19]

van Drunen

[11] Patent Number: 5,017,401

[45] Date of Patent: May 21, 1991

[54] METHOD AND ARRANGEMENT AND METHOD FOR THE MANUFACTURING OF COATED MOULDINGS, IN PARTICULAR OF CAPSULES CONTAINING PHARMACEUTICAL MATERIALS AND ARE MEANT TO BE USED AS MEDICINE

[76] Inventor: Johannes R. van Drunen, Van der Duinstraat 113, The Hague, Netherlands, 2515 NH

[21] Appl. No.: 425,204

[22] PCT Filed: Apr. 28, 1988

[86] PCT No.: PCT/NL88/00019
§ 371 Date: Oct. 17, 1989
§ 102(e) Date: Oct. 17, 1989

[87] PCT Pub. No.: WO88/08292
PCT Pub. Date: Nov. 3, 1988

[30] Foreign Application Priority Data

May 1, 1987 [NL] Netherlands .......................... 8701041

[51] Int. Cl.⁵ .......................... A61K 9/00; B05D 7/00
[52] U.S. Cl. .......................... 427/3; 118/19; 118/20; 118/24; 118/303; 118/323; 118/DIG. 5; 427/213; 427/424; 427/425
[58] Field of Search .................. 427/3, 213, 424, 425; 118/303, 323, DIG. 5, 19, 20, 24

[56] References Cited

U.S. PATENT DOCUMENTS 4,740,390 4/1988 Külling .............................. 427/213
4,886,701 12/1989 Ehnert et al. ...................... 427/213

Primary Examiner—Janyce Bell
Attorney, Agent, or Firm—Griffin, Branigan & Butler

[57] ABSTRACT

Method and apparatus for coating mouldings consisting of fluidizing the mouldings by means of a rotating spiral gas flow. A holder (A) containing the mouldings is provided with gas inlets (3). A gas flow through the gas inlet (3) brings the mouldings in a spiral rotating movement in a sphere (C) placed on holder (A). Coating material is sprayed in the apparatus by a tube (D), oscillated by the gas flow, on the whirling mouldings.

23 Claims, 1 Drawing Sheet

U.S. Patent May 21, 1991 5,017,401
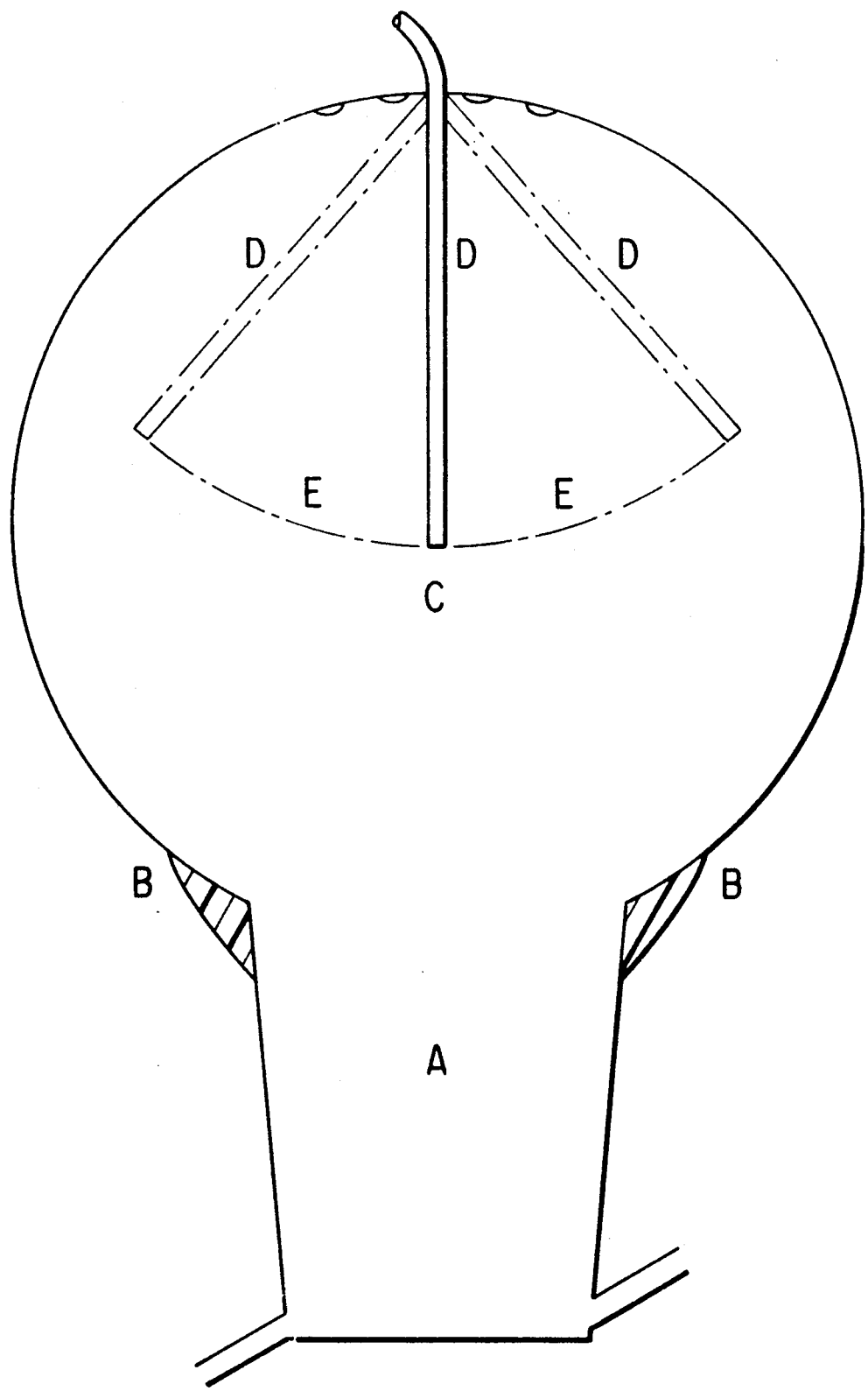

METHOD AND ARRANGEMENT AND METHOD FOR THE MANUFACTURING OF COATED MOULDINGS, IN PARTICULAR OF CAPSULES CONTAINING PHARMACEUTICAL MATERIALS AND ARE MEANT TO BE USED AS MEDICINE

This invention relates to a method and apparatus for the coating of mouldings, in which the mouldings are set in a revolving suspending motion along the wall of a holder by means of a spiral gas stream supplied to said holder, and wherein in the zone in which the mouldings are moving a coating material is dispersed.

The prior art methods and apparatuses, see for example U.S. Pat. Nos. 3,251,337 and 4,532,155, German Offenlegungsschrift 3,202,615, are very complicated and/or do not give really good results, and/or are only intended for a very large number of mouldings.

It is an object of the present invention to provide a method and an apparatus for the coating of mouldings, which is very simple, cheap and which can be used for a small number of mouldings.

To this effect, according to the invention, the method is characterized in that coating material is dispersed through a rotating aperture. In this way an optimal spraying technique has been developed.

The invention also relates to an apparatus for coating mouldings having a holder with one or more tangential gas inlets near the bottom and connected to a source of gas supply, which gas inlets are so arranged that each inlet produces a spiral gas stream and which holder has at least one gas outlet near the top, and which apparatus has a feeder for coating material, the outlet of which debouches in the zone wherein the mouldings are moving during operation of the apparatus and which apparatus is characterized in that the outlet of the feeder rotates so as to swivel around with another speed as related to the rotary speed of the mass of the mouldings or capsules in the zone wherein the mouldings are moving during operation of the arrangement.

Further the holder can consist of a lower cylindrically and/or conically widening container and a globular container fitted to the lower container, which globular container has gas outlets near the top around the axis. As a result, the mouldings or modules, in operation, will be moving at the location of the largest diameter in a revolving and tumbling motion. In this way a very simple and cheap method and apparatus for the coating of mouldings is developed. So a revolving gas stream provides the means to move the mouldings and the feeder outlet around in such a way that the coating material can be dispersed onto the said mouldings.

By dismountably fastening the outlet of the feeder for coating material in the upper spherical container or the lower cylindrically and/or conically widening container, it is possible to quickly clean the globular container after use.

BRIEF DESCRIPTION OF THE DRAWING

The FIGURE shows an apparatus usable in the invention.

The invention will now be clarified by means of an example. In a holder A, with two air inlets opposite each other, placed at an angle in relation to the centrepoint, near the bottom, 100 capsules will be inserted.

On the holder a glass sphere C is situated, with an opening to the bottom secured by means of a rim B to prevent air-loss, and air outlets to the top to let the air escape. If air is applied through the air inlets the capsules are lifted and start to rotate inside the glass sphere, due to the upward rotating air movement, the same air movement, the level on which the capsules are moving, and the convexity of the glass sphere causing the capsules to tumble around each other.

A tube D protruding downward from a hole in the centretop of the glass sphere starts to swivel around in the same air-stream with another speed as related to the rotating speed of the mass of the capsules.

If the length of the tube D is chosen in such a way that the swiveling action E of the tube remains short a slight distance from the revolving capsules, this distance, among other things, dependent on the volatility of the liquid to be evaporated, and through this tube a liquid is passed on, the liquid will be sprayed upon the sides of the capsules turned away from the glass wall.

Since the capsules are changing position continuously, they will be evenly provided with the liquid flung from the tube. The liquid evaporates instantly and the released dissolved material forms a layer around the capsules.

Capsules can be obtained with a very even layer and smooth surface, complying with the requirements of reliability.

I claim:

1. Apparatus for coating a plurality of articles, comprising:

(A) a holder base for initially holding the articles to be coated and having a base end, and opened upper end and a holder cavity therebetween;

(B) a removable upper container having an opened bottom end which is in fluid communication with the said opened upper end and which is secured to said opened upper end in a substantially gas tight manner, and said upper container having at least one gas discharge outlet disposed near an upper portion thereof;

(C) at least one gas inlet disposed in said holder cavity and disposed at an angle to a diameter of said holder cavity;

(D) adjustable pressurized gas supply means connected to said at least one gas inlet for supplying an adjustable volume of gas to the holder cavity, and wherein the gas supply means is sufficiently adjustable that the volumn of gas passed through said at least one gas inlet is sufficient to cause a swirling motion of the gas within the holder cavity and within the upper container so that the articles to be coated are entrained in the swirling gas and are continually suspended and rotated by the gas in a swirling zone of the upper container; and (E) a coating material feeder means for passing a coating material into said upper container and having a feeder outlet disposed in or near said swirling zone and said feeder outlet is rotatable in or near said swirling zone; and wherein coating material passing through said feeder outlet substantially uniformly coats the articles suspended and rotated in said swirling zone.

2. The apparatus of claim 1 wherein the upper container is of a general globular configuration.

3. The apparatus of claim 2 wherein the holder cavity is of a generally cylindrical or conical configuration.

4. The apparatus of claim 3 wherein the holder cavity is of a generally conical configuration with the larger diameter of the conical configuration being at said opened upper end of the holder base.

5. The apparatus of claim 9 wherein the gas inlet is substantially tangential to a diameter of said holder cavity.

6. The apparatus of claim 5 wherein the gas inlet is near the base end of the holder base.

7. The apparatus of claim 1 wherein the holder base is configured to initially contain a plurality of medicament capsules or pills.

8. The apparatus of claim 1 wherein there are a plurality of gas discharge outlets and a plurality of gas inlets.

9. The apparatus of claim 1 wherein the gas supply means is an air supply means.

10. The apparatus of claim 1 wherein the feeder outlet is rotated by movement of the gas in the swirling zone.

11. The apparatus of claim 10 wherein the feeder means is a flexible tube extending into the upper container and terminating in said feeder outlet.

12. The apparatus of claim 11 wherein the feeder means is disconnectably carried by said upper container.

13. The apparatus of claim 12 wherein the flexible tube is frictionally received through an aperture in the upper portion of the upper container.

14. The apparatus of claim 1 wherein the speed of rotation of the articles is different from the speed of rotation of said feeder outlet.

15. The apparatus of claim 11 wherein the length of the flexible tube in the upper container is adjustable.

16. A method for coating a plurality of articles with a coating material, comprising:
(A) placing a plurality of articles to be coated in a coating apparatus having a holder cavity in a holder base for containing the articles and an upper container surmounting the holder base and in fluid communication therewith;
(B) continuously passing a pressurized gas into the holder cavity in a direction and in a volume sufficient to cause a swirling motion of the gas within the holder cavity and within the upper container so that the articles to be coated are entrained in the swirling gas and are continually suspended and rotated by the gas in a swirling zone in the upper container;
(C) feeding a coating material through a feeder having an outlet in or near said swirling zone and causing the said feeder outlet to rotate in or near said swirling zone wherein the coating material is substantially uniformly dispersed on said articles; and
(D) passing the gas through at least one gas discharge outlet disposed near the upper portion of said upper container.

17. The method of claim 16 wherein the upper container is of a generally globular configuration, the holder cavity is of a generally cylindrical or conical configuration, and the gas is caused to swirl in the globular upper container.

18. The method of claim 17 wherein the gas is passed into the holder cavity in a direction which is at an angle to a diameter of the holder cavity.

19. The method of claim 18 wherein the gas is passed into the holder cavity near the base thereof.

20. The method of claim 16 wherein the feeder outlet is rotated by movement of the gas in the swirling zone.

21. The method of claim 20 wherein the feeder is an adjustable length of a flexible tube extending into the upper container and the tube is rotated by movement of the swirling gas.

22. The method of claim 21 wherein the speed of rotation of the articles is different from the speed of rotation of the flexible tube.

23. The method of claim 16 wherein the articles are medicament capsules or pills and the gas is air.

* * * * *